United States Patent
Watkins et al.

(10) Patent No.: US 6,799,877 B2
(45) Date of Patent: Oct. 5, 2004

(54) EMERGENCY LIGHT SIGNAL

(75) Inventors: Leslie Watkins, Claremont, CA (US); Michael Alerich, Claremont, CA (US)

(73) Assignee: Don't Die, LLC, Claremont, CA (US)

( * ) Notice: Subject to any disclaimer, the term of this patent is extended or adjusted under 35 U.S.C. 154(b) by 24 days.

(21) Appl. No.: 10/318,164

(22) Filed: Dec. 13, 2002

(65) Prior Publication Data

US 2004/0114391 A1 Jun. 17, 2004

(51) Int. Cl.[7] .................................................. F21V 7/04
(52) U.S. Cl. ...................... 362/542; 362/497; 362/498; 40/204; 40/205
(58) Field of Search .................................. 362/497, 498, 362/499, 541, 542; 40/204, 205; 340/475

(56) References Cited

U.S. PATENT DOCUMENTS

| | | | |
|---|---|---|---|
| 3,175,186 A | | 3/1965 | Barenyi |
| 4,127,844 A | | 11/1978 | Purdy |
| 4,613,847 A | * | 9/1986 | Scolari et al. .............. 340/473 |
| 4,670,736 A | | 6/1987 | Ulrich |
| D294,975 S | | 3/1988 | Lester |
| 4,981,363 A | | 1/1991 | Lipman |
| 5,175,528 A | | 12/1992 | Choi et al. |
| D381,923 S | | 8/1997 | Rowe et al. |
| 5,803,579 A | | 9/1998 | Turnbull et al. |
| 5,857,759 A | | 1/1999 | Latta et al. |
| 6,018,295 A | | 1/2000 | Jewell et al. |
| 6,025,775 A | | 2/2000 | Erlandson |
| 6,526,680 B1 | * | 3/2003 | Yu ............................... 40/204 |
| 6,552,658 B1 | * | 4/2003 | Roller et al. ................ 340/475 |

* cited by examiner

Primary Examiner—Stephen Husar
Assistant Examiner—Anabel Ton
(74) Attorney, Agent, or Firm—Richard C. Litman

(57) ABSTRACT

An emergency light signal adapted to be mounted to a motor vehicle using at least one motor vehicle license plate mounting bolt. The light signal is comprised of a signal housing having at least one high-intensity light-emitting diode deriving power from circuitry which when activated from within the passenger compartment of a vehicle, generates a brilliant flashing signal to draw the attention of nearby vehicles or pedestrians. The switch within the passenger compartment may be hardwired to the signal hot using or alternatively may be activated by remote control. The light signal may draw power from either the vehicle's own battery, or may be powered by a separate voltage source.

16 Claims, 5 Drawing Sheets

EMERGENCY LIGHT SIGNAL

BACKGROUND OF THE INVENTION

1. Field of the Invention

The present invention is related to flashing emergency lights, and more specifically, to a high intensity flashing emergency light affixed to a vehicle license plate, which in the case of an emergency can be activated from within the passenger compartment of the vehicle. The light signal uses high intensity light-emitting diodes (LEDs) for improved visibility, longer life, higher reliability.

2. Description of the Related Art

Lighting devices and in particular trouble warning lights are well known in the related art and serve several purposes. One such purpose served is to significantly boost a following driver's visual cognitive threshold of awareness regarding the state of a leading vehicle's turning or braking. Another purpose speaks to devices intended for emergency vehicles. The present invention relates to signaling devices for passenger vehicles which need to signal for assistance in emergency situations.

A vehicle strobe warning light system taught in U.S. Pat. No. 4,121,844 issued to Purdy in 1978 is a high-intensity, electronic flash lamp in combination with a vehicle's conventional brake, turn signal, and emergency flasher light assemblies. The lamp assembly is comprised of a gas filled lamp discharged across capacitors operating at about 800 to several thousand volts D.C.

U.S. Pat. No. 3,175,186 issued to Barenyi in 1965 discloses a lighting arrangement positioned at the forward and rear hood of a vehicle which, when the hood is raised during breakdowns, the lights will give other participants in traffic a clear and timely warning signal. U.S. Pat. No. Des. 294,975 issued in 1988 to Lester discloses a combined license plate bracket and vehicle back up signal light. Another design patent show a design for a strobe stop light adapted to be mounted on a vehicle is disclosed in U.S. Pat. No. Des 381,923. The last device disclosed in this category is U.S. Pat. No. 6,025,775, issued 2000 to Erlandson and entails a stoplight system providing a high intensity flash at the instant of applying the brakes to catch the attention of the driver of a following vehicle.

Emergency lighting devices for emergency vehicles are well known in the art. U.S. Pat. No. 4,981,363 issued to Lipman in 1991 discloses incandescent or strobe lights mounted on the windshield of emergency vehicles. Furthermore, U.S. Pat. No. 5,857,759 issued to Latta et al. in 1999 discloses an emergency signal light using light bars and light pipes to divert substantially all light transmitted by the light pipe to a reflector to be observed remotely from the emergency vehicle.

Devices intended to attract attention in emergency situations include an emergency signal apparatus disclosed in U.S. Pat. No. 4,613,847 issued to Scolari et al. in 1986, which teaches a self-contained emergency signal having a base containing a battery and a high-intensity flash lamp activated by a switch or remote control. U.S. Pat. No. 4,670,736 issued to Ulrich in 1987 discloses a electronic circuit board and circuitry, which when activated by a switch, causes the lights on a vehicle to flash on and off intermittently. Furthermore, U.S. Pat. No. 6,018,295 issued to Jewell et al. in 2000 discloses a vehicle safety light system that includes a plurality of light elements each having multiple light emitting devices, an on/off switch, and a light element controller which activates the lamps at a plurality of different blink rates. U.S. Pat. No. 5,803,579, issued in 1998 to Turnbull et al. discloses an illuminator assembly having a plurality of different colored LEDs on a vehicular support member, arranged in such a manner that when activated by an electronic control unit, the overlapped and mixed illumination of the LEDs form a composite white color having sufficient intensity and color qualities as to be an effective illuminator.

Innovations in lamp design for emergency signaling devices includes LEDs and more recently, super luminescent LEDs. Super luminescent LEDs provide higher luminosity than standard LEDs while still retaining the benefits of standard LEDs which include lower power consumption, higher reliability and longer life. U.S. Pat. No. 5,175,528 issued to Choi et al. in 1992 discloses a flashing safely warning light in which a super luminescent LED is driven by a double oscillator circuit.

The related art has not adequately addressed the need for a small, effective emergency flasher of high luminosity, high reliability and low cost, which can be easily affixed to a visible portion of the exterior of a vehicle and be controlled by a switch from within the passenger compartment of the vehicle.

None of the above inventions and patents, taken either singularly or in combination, is seen to describe the instant invention as claimed. Thus a emergency light signal solving the aforementioned problems is desired.

SUMMARY OF THE INVENTION

The present invention is an emergency light signal having at least one high-intensity light-emitting diode (LED) disposed in an enclosure mounted between the top and/or bottom mounting bolts of an automotive vehicle license plate or may be mounted to any portion of a vehicle having at least one mounting bolt. The emergency light signal, activated by a switch within or proximate to the vehicle, generates a brilliant flashing signal.

Accordingly, it is a principal object of the invention to provide an emergency light signaling device having a high-intensity flashing signal.

It is another object of the invention to provide an emergency light signal which can be easily disposed on a vehicle, such as the vehicle's license plate.

It is another object of the invention to provide an emergency light signaling device which is activated by a button either within the vehicle or by a hand held wireless device.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
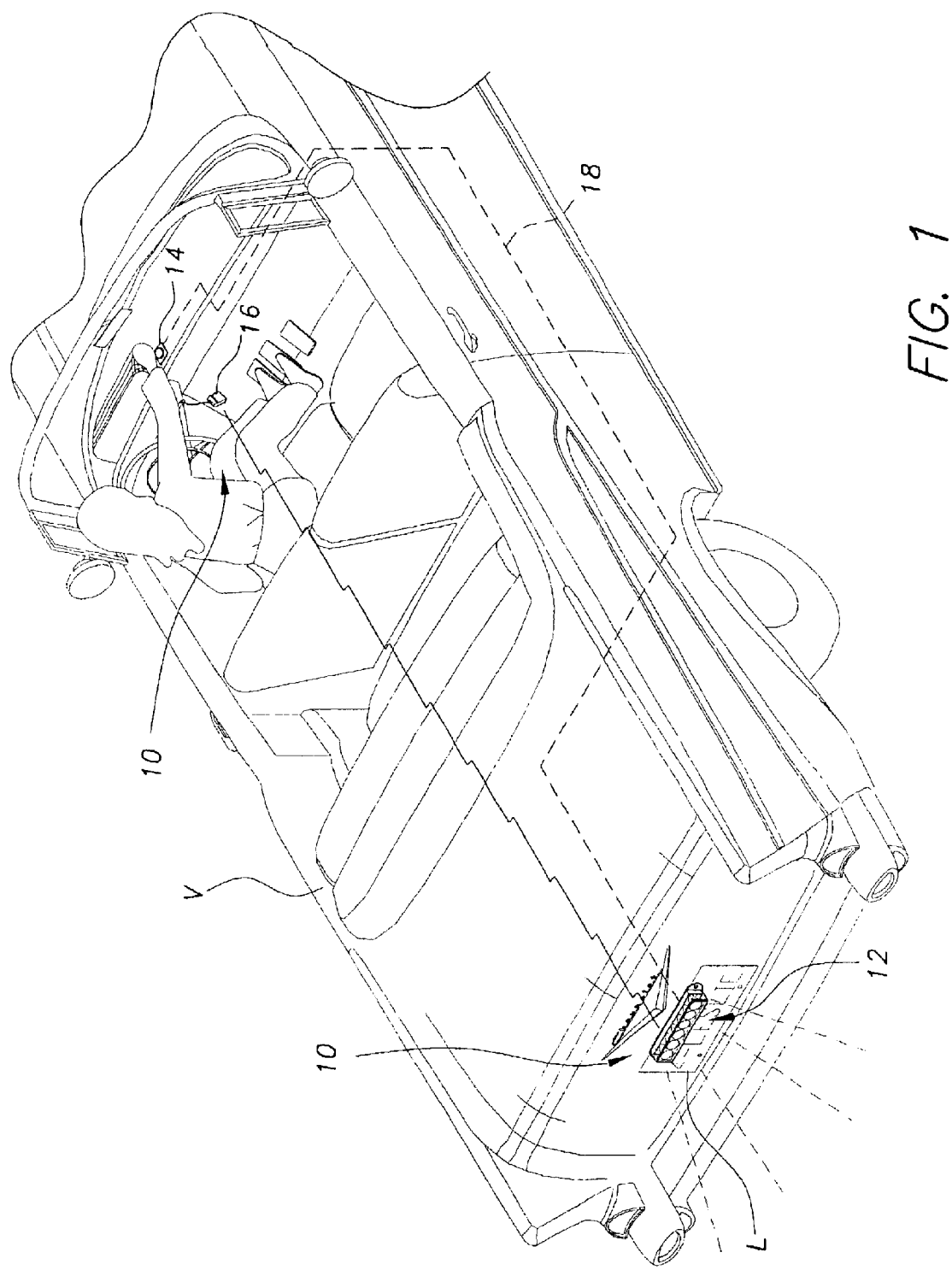
FIG. 1 is an environmental, perspective view of a emergency light signal according to the present invention.

FIG. 1 illustrates the emergency light signal 10 being used by a occupant of a vehicle V to signal for assistance. The light signal 10 is comprised of signal housing 12 mechanically mounted to the vehicle's license plate L, and a dashboard mounted switch 14 electrically connected to the signal housing 12 by electrically conducting wire 18 or by a wireless transmitter 16 it a wireless receiver (not shown), is provided. Wireless technology for controlling electronic devices such as the present invention is well known in the art and includes infra-red and radio transmitters and receivers.

Figure 2A:
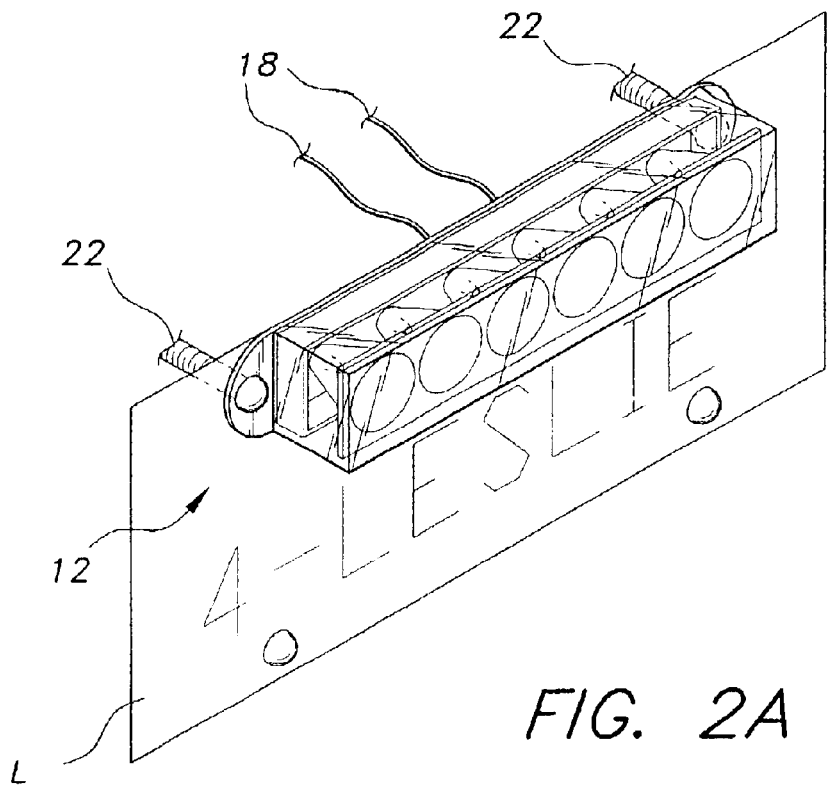
FIGS. 2A and 2B are perspective views of two embodiments of the signal housing.
Figure 2B:
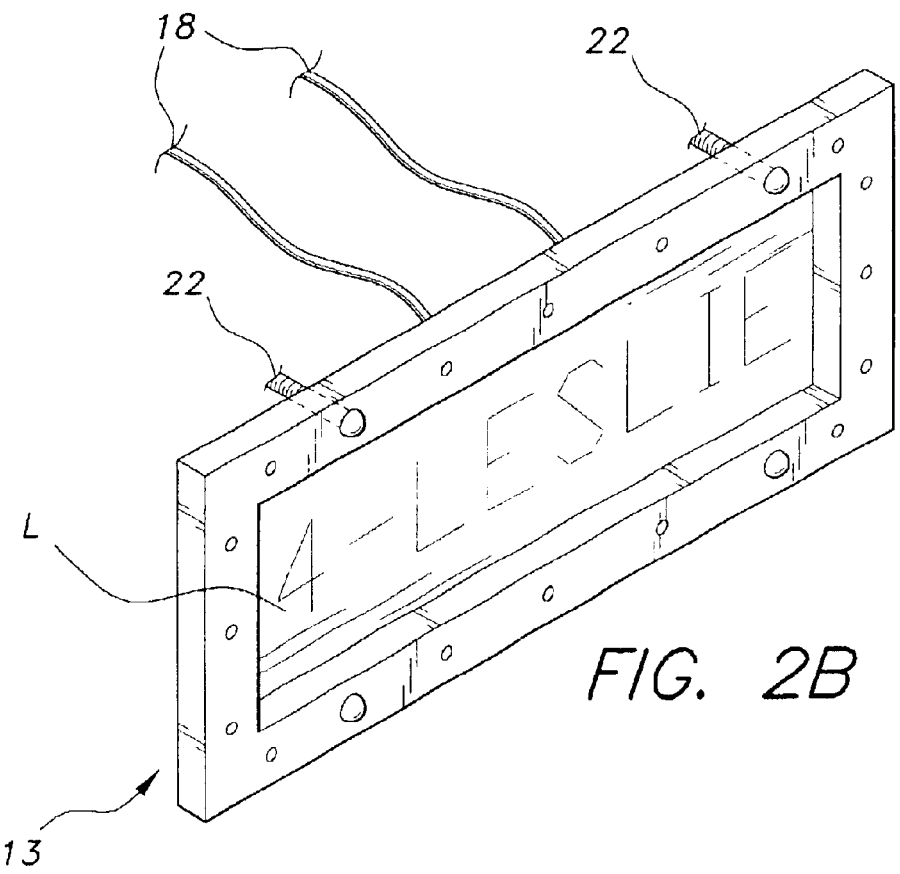

FIG. 2A shows one embodiment of the signal housing 12 mounted to a vehicle license plate L using the top two license plate mounting bolts 22. An alternative signal housing 13 is shown in FIG. 2B, and illustrates a signal housing in the shape of a frame around the perimeter of the license plate L. As shown in the embodiment of FIG. 2A and more clearly in FIG. 3, the signal housing is substantially rectangular, approximately 1½ inches wide, 8 inches long, and is adapted to fit between the top two mounting bolts 22 of a motor vehicle license plate L. The housing 12, comprises a rear mounting plate 24 and a front cover 28, made of a substantially planar, substantially rigid material such as plastic, with apertures 26 disposed on each end of the mounting plate 24, adapted to receive the top two mounting bolts 22 of the motor vehicle license plate L.

Although it may be seen that the emergency light signal structure of the invention can take many forms, all embodiments include at least one high-intensity LED flashing at a pre-determined frequency and visible through the cover 28. The cover 28 may be substantially clear, frosted, may contain written indicia, or may comprise light focusing means such as a Fresnel lens (not shown). The cover 28 is adapted to receive a raised lip 36 extending from the mounting plate 24, and a waterproof seal, such as a rubber ring 38, is disposed between the cover 28 and the mounting plate 24.

The cover 28 is secured to the mounting plate 24 using glue or any other suitable attachment. A reflector assembly 34 is disposed over LEDs D1–D6 and consists of at least one conical, parabolic, or elliptical reflector 40 typically made of metal or metal-coated plastic. The purpose of the reflector assembly 34 is to collect or direct the light emitted from the LEDs D1–D6 and project it in a narrower and more brilliant beam than otherwise would occur. In another embodiment, the reflector would be replaced by a light deflecting assembly, not shown, which would operate to direct the light emitted from the LEDs D1–D6 in a direction other than directly outward from the light source.

Figure 3:
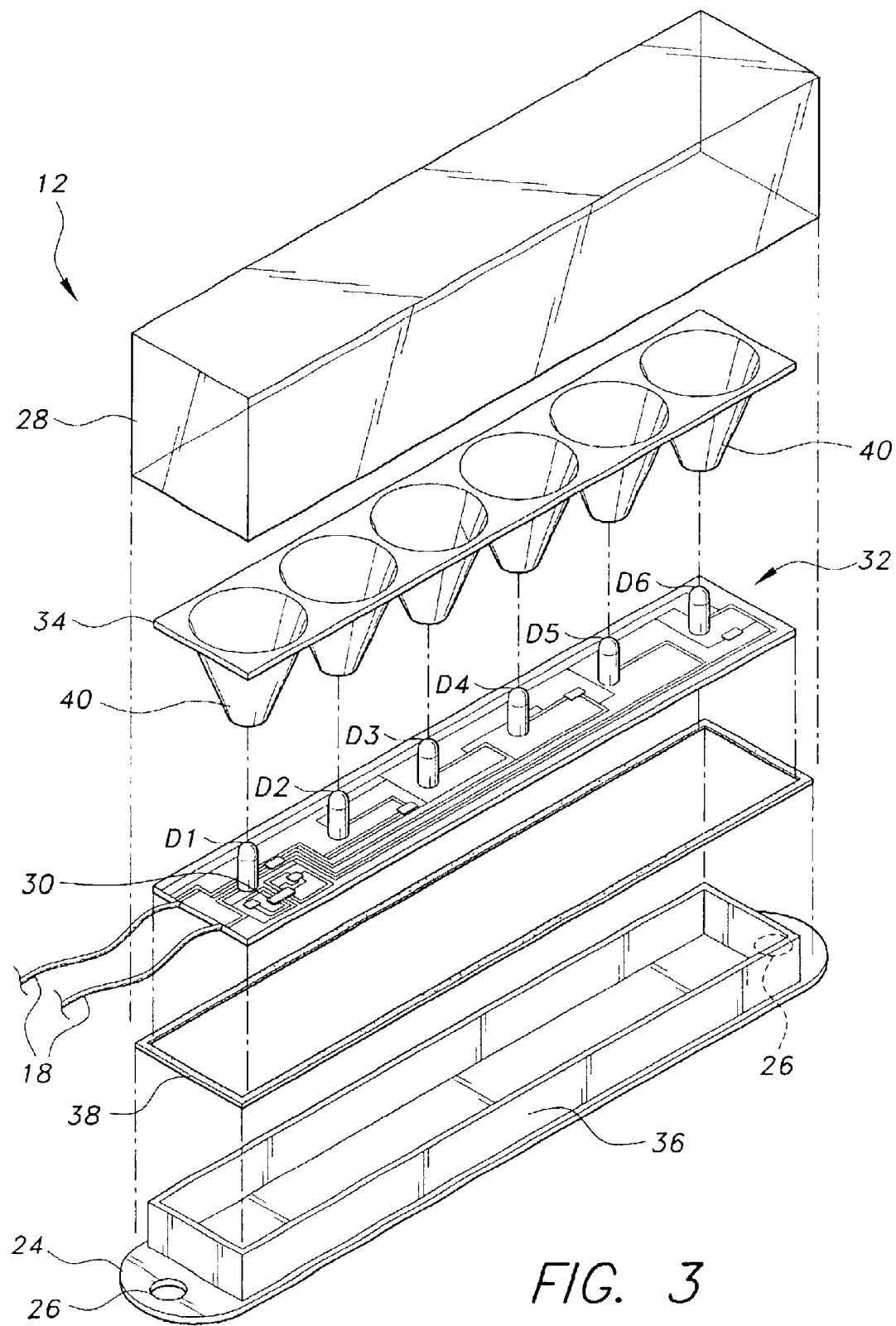
FIG. 3 is an exploded perspective view of one embodiment of signal housing.

As shown in FIG. 3, LEDs D1–D6 and control and driver circuitry 30 are disposed on an operating circuit board 32 contained within the signal housing 12. LEDs D1–D6 are high intensity LEDs and may be green, white, blue or amber with typically optical and electrical characteristics of 5600 mcd when applied with an input of 20 mA at 3.6 volts. A pair of wires 18 disposed on the circuit board 32 provides the circuitry with electric power, the details of which are described below.

Figure 4:
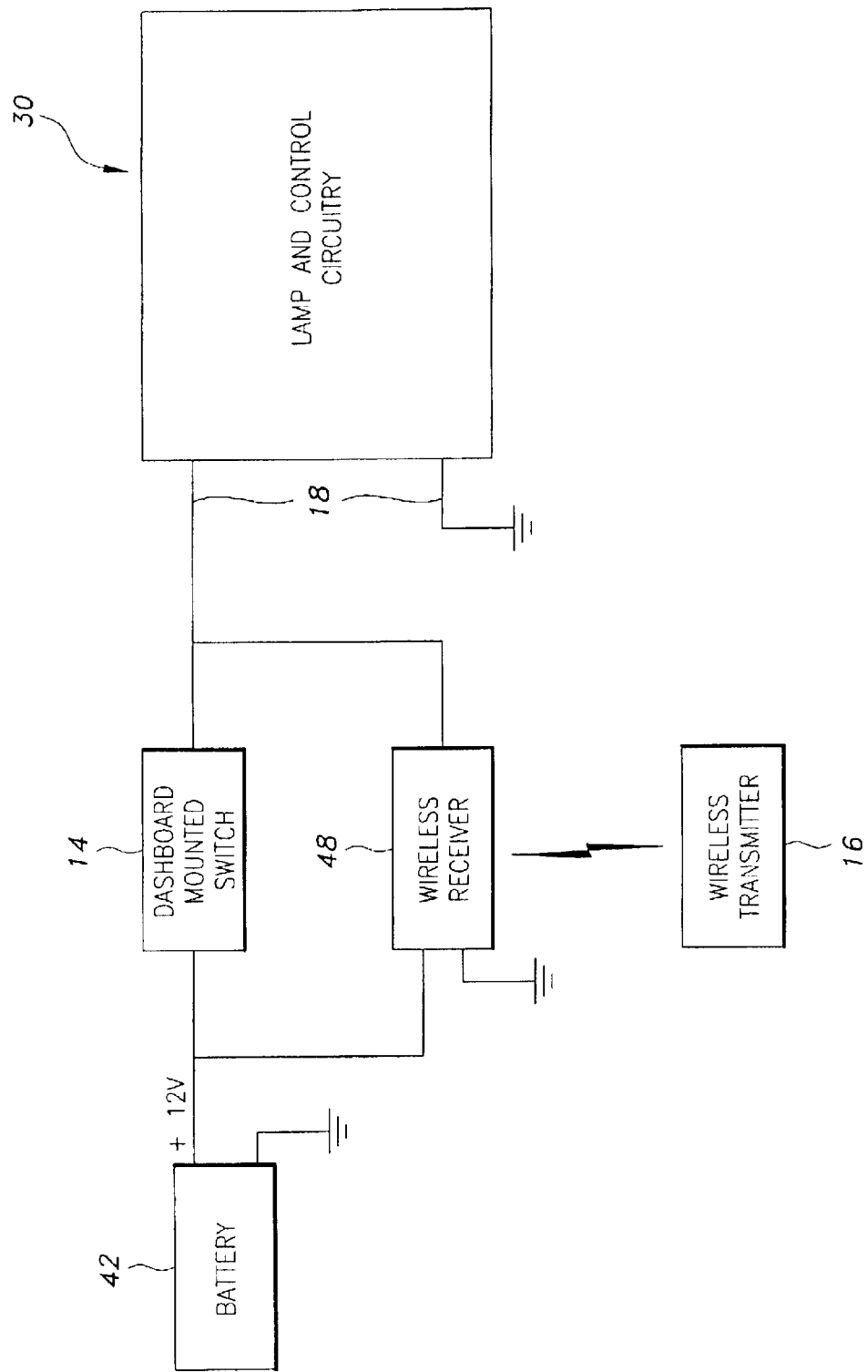
FIG. 4 is a functional block diagram of the emergency light, signal according to the present invention.
Figure 5:
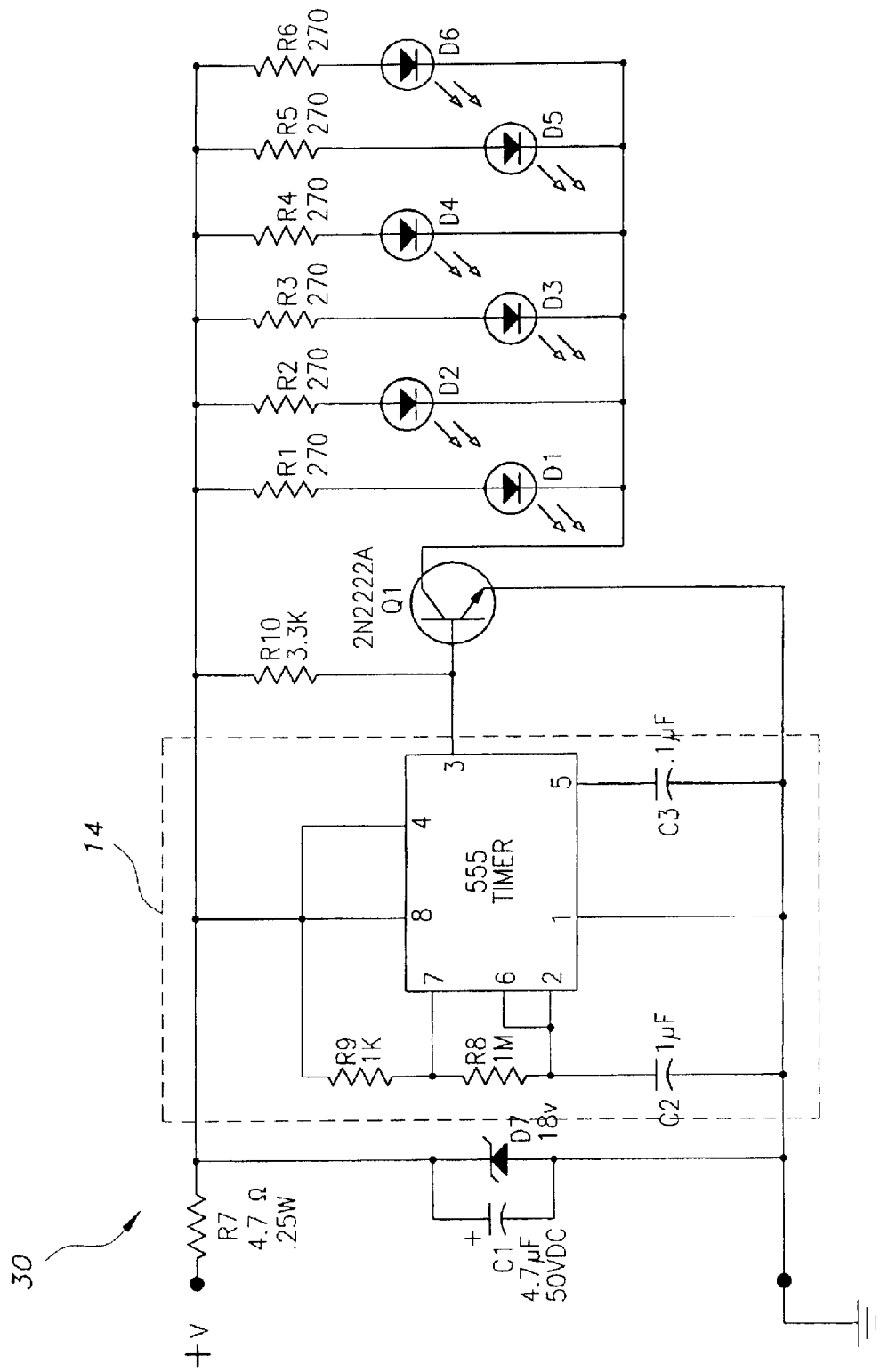
FIG. 5 is a representative schematic diagram of the lamp and control circuit according to the present invention.

A functional block diagram is shown in FIG. 4 and illustrates a battery 42 supplying a voltage potential of about 12 volts to control and driver circuitry 30 when dashboard mounted switch 14 is closed or when wireless receiver 48 is activated by transmitter 16. As shown in schematic diagram FIG. 5, current limiting resistor R7 in combination with capacitor C1, and Zener diode D7 provides oscillator circuit 44 with stable power when switch 14 is closed or when the wireless transmitter 16 is keyed. Oscillator circuit 44 is comprised of a 555 timer configured as shown in FIG. 3 to deliver an intermittent signal to the base of transistor Q1, which when activated, energizes LEDs D1–D6, creating a high-intensity flashing signal light. The voltage potential is not limited to 12 volts and the block diagram shown in FIG. 4 and the circuit diagram of FIG. 5 may be modified for a variety of input voltages.

The 555 timer is one of the most popular and versatile integrated circuits whose electrical characteristics are well known to those skilled in the art. Capacitor C2 charges through resistor R8 and R9 but discharges through resistor R8, creating an oscillator the period and duty cycle of which is strictly a function of C2, R8 and R9 and have been selected in the present invention to generate a square wave with a period of about 1.4 seconds. However, other oscillator circuits using components such as the 741 op amp or a microprocessor may be substituted for the 555 timer and would be obvious to one skilled in the art.

It is to be understood that the present invention is not limited to the embodiments described above, but encompasses any and all embodiments within the scope of the following claims.

We claim:

1. A emergency light signal for attachment to the exterior of a motor vehicle, comprising:
   (a) a light signal housing having a front, a rear, and an operating circuit board, wherein at least the front of said housing is made of light transmitting material, said housing being dimensioned and configured for attachment to the vehicle using the vehicle's license plate mounting bolts;
   (b) at least one high-intensity light emitting diode (LED) disposed in said circuit board; and
   (c) an oscillator circuit disposed on said circuit board, said oscillator circuit having an intermittent output signal, a LED driver circuit connected to the LED, the LED driver circuit responsive to the output of the oscillator circuit, said circuit board having means for applying power to said oscillator circuit and said LED driver circuit operable by an occupant from within the passenger compartment of the motor vehicle.

2. The emergency light signal according to claim 1, wherein said power applying means includes a dashboard mounted switch wired to said circuitry.

3. The emergency light signal according to claim 1, wherein said power applying means includes a remote control transmitter and receiver.

4. The emergency light signal according to claim 1, wherein said housing is a frame encompassing the perimeter of the vehicle license plate with apertures therein adapted to receive the motor vehicle license plate mounting bolts.

5. The emergency light signal according to claim 1, wherein said signaling unit further comprises at least one reflector for directing and focusing the light emitting from said at least one LED.

6. The emergency light signal according to claim 1, wherein said circuitry includes an oscillator circuit for generating an intermittent pulse of predetermined electrical characteristics, and a lamp driver circuit responsive to said intermittent pulse for intermittently powering said at least one LED when said power applying means is activated.

7. The emergency light signal according to claim 1, wherein at least said front is clear.

8. A emergency light signal for attachment to a license plate mounted on a motor vehicle, comprising:
  (a) a light signal housing having a front, a rear, a left side and a right side, said left and right sides having apertures disposed within for attachment to a license plate, and an operating circuit board;
  (b) at least one high-intensity light emitting diode (LED) disposed in said housing; and
  (c) LED driver circuitry electrically connected to said at least one high intensity LED, said circuitry having means for applying power to said circuitry operable by an occupant from within the passenger compartment of the motor vehicle;

wherein at least said front is made of light transmitting material, said power applying means includes a dashboard mounted switch wired to said circuitry, and said circuitry includes an oscillator circuit for generating an intermittent pulse of pre-determined electrical characteristics and a lamp driver circuit responsive to said intermittent pulse for intermittently powering said at least one LED when said power applying means is activated.

9. The emergency light signal according to claim 8, wherein said power applying means includes a remote control transmitter and receiver.

10. The emergency light signal according to claim 9, wherein said receiver is contained within said housing.

11. The emergency light signal according to claim 8, wherein said housing encompasses the perimeter of the vehicle license plate.

12. The emergency light signal according to claim 8, wherein said signaling unit further comprises at least one reflector for directing and focusing the light emitting from said at least one LED.

13. The emergency light signal according to claim 8, further comprising a battery electrically connected to said circuitry.

14. The emergency light signal according to claim 8, wherein at least said front is clear.

15. The emergency light signal according to claim 8, wherein at least said front contains indicia.

16. The emergency light signal according to claim 8, wherein at least said front has means for focusing the light emitting from said at least one LED.

\* \* \* \* \*